Patented Aug. 14, 1945

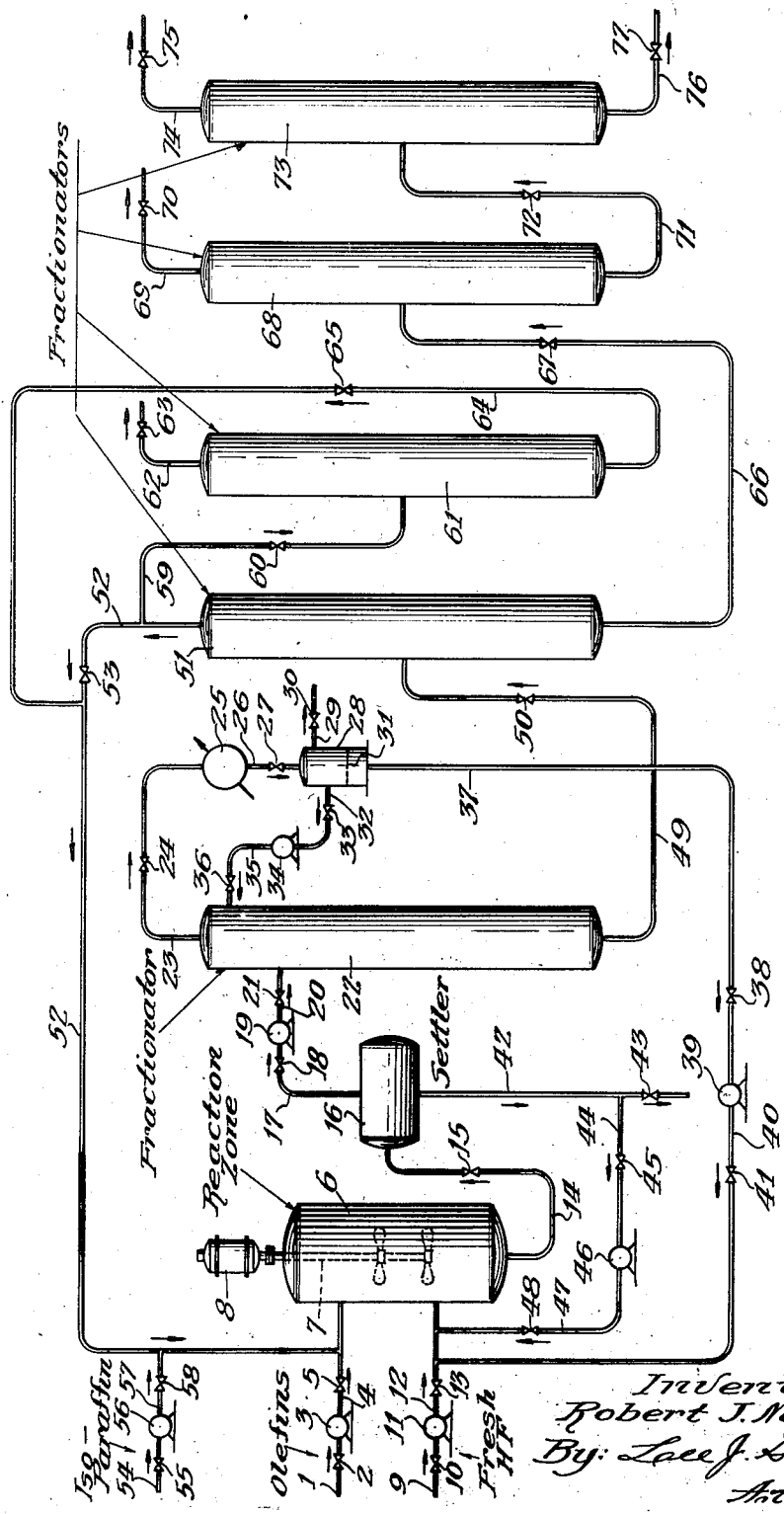

2,382,899

UNITED STATES PATENT OFFICE 2,382,899

ALKYLATION OF BRANCHED CHAIN PARAFFIN HYDROCARBONS

Robert J. Newman, Riverside, Ill., assignor to Universal Oil Products Company, Chicago, Ill., a corporation of Delaware Application April 30, 1943, Serial No. 485,146

5 Claims. (Cl. 260—683.4)

This invention relates to improvements in the conversion of hydrocarbons in the presence of a hydrogen fluoride catalyst. It is particularly related to improvements in the alkylation of isoparaffins with olefins in the presence of a hydrogen fluoride catalyst.

The production of higher molecular weight branched chain paraffins having valuable antiknock properties and, therefore, suitable for use in aviation fuels is of considerable importance in the petroleum industry. A convenient and widely used method for the synthesis of hydrocarbons of this type is the catalytic alkylation of lower boiling isoparaffins such as isobutane and isopentane with normally gaseous olefins such as propylene and butylenes. Large quantities of these hydrocarbons are available from various hydrocarbon conversion processes, e. g., the cracking of hydrocarbon oils, and also from the natural gasoline industry.

Hydrogen fluoride catalysts are particularly effective for the reaction of branched chain paraffinic hydrocarbons containing at least one tertiary carbon atom per molecule with olefinic hydrocarbons. However, I have found that frequently when fresh hydrogen fluoride catalyst is employed, for example, in the alkylation of isobutane with butylenes, there is a substantial period of time in the initial part of the run during which the alkylate produced is of an inferior quality as compared with the quality of the alkylate produced during later periods. The poor quality of this initially produced alkylate is reflected particularly in its antiknock characteristics.

One object of the present invention is to provide various methods of operation whereby the quantity of the poor quality alkylate produced in a hydrogen fluoride alkylation process is reduced to a minimum. Another object of my invention is to correlate the operating conditions in an isoparaffin-olefin alkylation process employing a hydrogen fluoride catalyst whereby the maximum efficiency is obtained from a given quantity of fresh catalyst.

In one broad aspect the invention comprises correlating the conditions of temperature, isoparaffin to olefin ratio, catalyst to hydrocarbon ratio, fresh catalyst space velocity, and space time in an isoparaffin-olefin alkylation process employing a hydrogen fluoride catalyst whereby to decrease the quantity of inferior alkylate which is produced during the initial reaction period employing a relatively fresh catalyst.

In one specific embodiment the invention comprises an improvement in the process for the production of branched chain paraffinic hydrocarbons wherein a paraffinic hydrocarbon containing at least one tertiary carbon atom per molecule is alkylated with an olefinic hydrocarbon in the presence of a hydrogen fluoride catalyst, hydrocarbon reaction products are separated from used catalyst, and at least a portion of said used catalyst is recycled to the alkylation zone, said improvement comprising the steps of maintaining in the alkylation zone a relatively low volumetric ratio of catalyst to hydrocarbon during the initial period of operation with a fresh catalyst until the concentration of organic diluent in the catalyst increases to a predetermined value and subsequently increasing said volumetric ratio of catalyst to hydrocarbon in the alkylation zone to a relatively higher value and thereafter regulating the rate of addition of fresh catalyst and the rate of withdrawal of used catalyst to maintain said predetermined concentration of organic diluent substantially constant.

The alkylation of isoparaffins with olefins in the presence of a hydrogen fluoride catalyst is ordinarily conducted by introducing the hydrocarbon charging stock and catalyst into a mechanically agitated reaction zone or any other zone suitable for effecting intimate contact between the hydrocarbons and catalyst. The hydrocarbon-catalyst mixture is maintained at the desired temperature and pressure for the required reaction time. It is desirable to maintain a substantial molar excess of isoparaffins over olefins in the hydrocarbon feed to the alkylation zone. The reaction mixture is withdrawn and is introduced into a separation zone which ordinarily will comprise a gravity settler. The lower catalyst layer is withdrawn and a major portion thereof is recycled to the alkylation zone although another portion thereof may be withdrawn from the system and subjected to regeneration. Regenerated and/or fresh catalyst is added to the alkylation zone to maintain a relatively constant amount of catalyst within the reaction system. The upper hydrocarbon layer from the settler is subjected to fractionation for the recovery of gasoline boiling range products and for the separation of unconverted isoparaffins which are recycled to the alkylation zone.

Reference is made to the drawing which illustrates in greater detail one manner in which an alkylation process is conducted using a hydrogen fluoride catalyst.

An olefinic charging stock which may comprise a butane-butylene fraction containing 30-40 mol per cent butylenes is introduced through line 1 containing valve 2 to pump 3 which discharges through line 4 containing valve 5 into reaction zone 6. For the sake of illustration, this zone is depicted as a mechanically agitated reaction zone containing stirring device 7 operated by motor 8. It is to be understood that any convenient type of contacting equipment may be used. Recycled isoparaffinic hydrocarbons are also introduced from line 52, hereinafter described, into line 4 and thence into reaction zone 6. Fresh and/or regenerated hydrogen fluoride catalyst is passed through line 9 and valve 10 to pump 11 which discharges through line 12 containing valve 13 into reaction zone 6.

The hydrocarbon-catalyst mixture is withdrawn through line 14 and valve 15 to settling zone 16. The lower used catalyst layer is withdrawn through line 42 and a substantial portion thereof is recycled through line 44 containing valve 45, pump 46, and line 47 containing valve 48 to line 12 and thence into reaction zone 6. A portion of the used catalyst is diverted through valve 43 to a regeneration system not shown wherein organic contaminants and water are removed from the used catalyst. The purified or regenerated hydrogen fluoride may then be introduced to the alkylation system through line 9 as previously described.

The upper hydrocarbon layer from settler 16 passes through line 17 and valve 18 to pump 19 which discharges through line 20 containing valve 21 into a fractionating column 22. In this column, which may be termed a "hydrogen fluoride stripping column," dissolved hydrogen fluoride contained in the hydrocarbon products is recovered and recycled to the alkylation step. By virtue of the low solubility of hydrogen fluoride in paraffinic hydrocarbons and the peculiar vaporization characteristics of the hydrocarbon-hydrogen fluoride system, it is possible to distill overhead in fractionator 22, a major portion of hydrogen fluoride along with light hydrocarbons such as propane and butane. The ovehead mixture passes through line 23 and valve 24 to condenser 25. The mixture of condensate and any noncondensable gases is transferred through line 26 and valve 27 to receiver 28. Noncondensable gases may be vented through line 29 and valve 30. In receiver 28 a lower hydrogen fluoride layer is separated and withdrawn through line 37 containing valve 38 and is returned by means of pump 39 through line 40 and valve 41 to line 12 and thence into reaction zone 6. The upper hydrocarbon layer in receiver 28 which may be substantially saturated with hydrogen fluoride is returned in entirety through line 32 containing valve 33, pump 34, and line 35 containing valve 36 to fractionator 22 to serve as reflux. The interface between the hydrocarbon and hydrogen fluoride layers in receiver 28 is indicated by dotted line 31. In certain cases, it may be desirable to return the hydrocarbon reflux along with the feed to the fractionator through line 20. It will thus be seen that in most cases the net product removed from fractionator 22 comprises only hydrogen fluoride.

A hydrocarbon stream which is substantially free of dissolved hydrogen fluoride is withdrawn from the bottom of fractionator 22 through line 49. This stream contains alkylation reaction products and excess or unconverted reactants particularly iso and normal butane. In many cases it will be desirable to provide a treating zone in line 49 for the removal of combined fluorine compounds. The hydrocarbon stream in line 49 is passed by means not shown through valve 50 to deisobutanizer 51. In this fractionator isobutane and lighter hydrocarbons, such as propane, if present, are removed overhead through line 52 and a substantial portion thereof is recycled through valve 53 to line 4 and thence into reaction zone 6. Additional fresh isoparaffin may be admitted to the system through line 54 containing valve 55, pump 56, and line 57 containing valve 58. If the deisobutanizer overhead contains substantial amounts of propane, it is generally desirable to divert a portion of the overhead stream through line 59 and valve 60 to fractionator 61 wherein propane is removed overhead through line 62 and valve 63. The depropanized bottoms from fractionator 61 are returned through line 64 and valve 65 to the isobutane recycle line 52 and thence to the alkylation zone.

The bottoms from fractionator 51 are charged through line 66 and valve 67 by means not shown to debutanizer 68. In this column normal butane is removed overhead through line 69 and valve 70. The debutanized alkylation products are withdrawn from column 68 through line 71 and charged by means not shown through valve 72 to rerun column 73. In the latter fractionation step gasoline boiling range alkylate is distilled overhead through line 74 and valve 75 and higher boiling alkylation products are recovered through line 76 containing valve 77.

For the sake of simplicity, most of the pumps, condensers, refluxing equipment, and reboilers which are ordinarily associated with fractionating columns of the type of columns 22, 51, 61, 68, and 73 have been omitted. To one skilled in the art, however, the use of these various types of equipment will be readily apparent.

By the term "hydrogen fluoride catalyst" as used throughout this specification and appended claims, it is intended to include catalysts wherein hydrogen fluoride is the essential active ingredient. Thus, it is within the scope of my invention to employ substantially anhydrous hydrogen fluoride or hydrofluoric acid or hydrogen fluoride containing various additives or promoters such as boron trifluoride. Ordinarily, commercial "anhydrous" hydrogen fluoride will be charged to the alkylation system as fresh catalyst. However, it is possible to use hydrogen fluoride containing as much as about 10% water. Excessive dilution with water is generally undesirable since it tends to reduce the alkylating activity of the catalyst and introduces corrosion problems.

The alkylation of isoparaffins with olefins in the presence of a hydrogen fluoride catalyst may be conducted at a temperature of from about 0° F. to about 200° F. although the reaction temperature is preferably within the range of from about 50° F. to about 150° F. The pressure on the alkylation system is ordinarily just high enough to maintain the hydrocarbons and catalyst in substantially the liquid phase, e. g., from about 50 to about 250 pounds per square inch. The time factor in the alkylation process is conveniently expressed in terms of "space time" which is defined as the volume of catalyst within the contacting zone divided by the volume rate per minute of hydrocarbon reactants charged to the zone. Usually the space time will fall within the range of from about 5 to about 80 minutes although in certain cases it may be desirable to extend this range in either direction. It has also been found convenient to express the rate of addition of fresh catalyst to the system in terms of "fresh catalyst space velocity" which is defined as the volume rate per hour of fresh catalyst charged to the system divided by the volume of catalyst in the contacting zone. The particular fresh catalyst space velocity employed in a given case will vary widely dependent upon the temperature of operation, the space time, the desired total acidity of the catalyst phase, and upon other considerations. However, as illustrative of a typical commercial operation with a butane-butylene charging stock at 100° F. and a space time of the order of 30-35 minutes, the fresh catalyst space velocity will usually be from about 0.008 to about 0.04 reciprocal hour. It is preferable to maintain at all times a substantial molar excess of isoparaffins over olefins in the hydrocarbon feed to the alkylation zone, e. g., from 3:1 to 10:1 or higher. In general, the volumetric ratio of catalyst to hydrocarbon in the contacting zone should be about 1:1, although ratios of from about 0.5:1 to about 1.5:1 will give satisfactory results.

Although the alkylation process of the present invention is particularly important in the case of the alkylation of isobutane with normally gaseous olefins such as propylene or butylene, it is generally applicable to the alkylation of any branched chain paraffinic hydrocarbon containing at least one tertiary carbon atom per molecule with an olefinic hydrocarbon. As olefinic reactants, the normally gaseous olefins including ethylene, propylene, and the butylenes may be employed. In the case of the less reactive ethylene, it is generally desirable to have boron trifluoride present in the catalyst in addition to hydrogen fluoride. Normally liquid olefins such as amylenes, hexenes, etc., including polymers of the lower molecular weight normally gaseous olefins may also be employed as olefinic reactants in the process with good results.

When hydrogen fluoride catalysts are employed in alkylation reactions, the catalyst gradually becomes contaminated with organic materials, and in a continuous method of operation as hereinbefore described herein used catalyst is recycled from the settling zone to the reaction zone, it will be apparent that these organic materials or contaminants will tend to accumulate in the catalyst phase and thereby serve effectively as a diluent for the catalyst. The nature of this organic diluent is not completely understood, but it apparently comprises relatively high molecular weight polymers and certain fluorine-containing hydrocarbon complexes. When an alkylation unit is first started up employing a fresh hydrogen fluoride catalyst, I have observed that the quality of the initially produced gasoline boiling range alkylate is relatively poor, particularly with respect to its octane number and other antiknock characteristics in aviation fuel blends. However, as the continuous operation of the process proceeds, the organic diluent content of the catalyst phase increases resulting in a lower effective concentration of hydrogen fluoride in the catalyst, and concurrently the quality of the gasoline boiling range alkylate is improved to a substantial extent.

In general then, operation of the alkylation unit during the preliminary period when the organic diluent content of the catalyst phase is below a predetermined or desired level results in the production of alkylate of inferior quality. My invention is concerned with various methods of decreasing the quantity of poor quality alkylate which is inherently manufactured during this preliminary period of operation. Broadly speaking, my invention achieves this desired result in either of two ways:

(1) By causing an increase in the rate of formation of organic diluent with the result that the desired proportions of organic diluent and hydrogen fluoride in the catalyst phase are reached in a much shorter time and the quantity of poor quality alkylate produced is thus decreased.

(2) By causing a decrease in the rate of production of alkylate during this period while at the same time the rate of production of organic diluent is not affected materially.

Either of these two general methods of approach to the problem may be adopted by properly correlating the process variables of temperature, isoparaffin to olefin ratio, catalyst to hydrocarbon ratio, space time, and fresh catalyst space-velocity to obtain the desired result. In general, I prefer to employ operating techniques which correspond to method 1, but it is equally within the scope of my invention to employ techniques for effecting method 2.

Method 1 is based on the experimental observation that the rate of formation of organic diluent is substantially increased by increasing the temperature of the reaction, by decreasing the isoparaffin to olefin ratio, or by decreasing the space time. Therefore, the principal operating techniques which may be employed under method 1 are as follows:

(a) Maintaining a relatively higher reaction temperature during the initial period of the run, and subsequently when the organic diluent content of the catalyst has increased to a predetermined level, lowering the reaction temperature to the normal operating temperature.

(b) Maintaining a relatively lower isoparaffin to olefin ratio during the initial period of the run, and subsequently when the organic diluent content of the catalyst has increased to a predetermined level, increasing the isoparaffin to olefin ratio to the normal operating level.

(c) Maintaining a relatively lower volumetric ratio of catalyst to hydrocarbon during the initial period of the run while at the same time maintaining a hydrocarbon charge rate which is substantially the same as the ultimate hydrocarbon charge rate; subsequently, when the desired amount of organic diluent has accumulated, fresh catalyst is added to the system until the desired catalyst to hydrocarbon ratio is reached and the hydrocarbon charge rate is kept substantially constant throughout; the rate of addition of fresh catalyst must be controlled to prevent the concentration of organic diluent from declining below the desired value; it will be seen that this operation in effect comprises the use of a low space time during the initial period of the run.

The principal operating technique to be employed under method 2 is as follows:

Maintaining a relatively lower volumetric ratio of catalyst to hydrocarbon during the initial period of the run while at the same time employing a relatively lower hydrocarbon charge rate whereby to obtain substantially the same space time that is ultimately desired; subsequently, when the desired amount of organic diluent has accumulated, fresh catalyst is added to the system to bring the catalyst to hydrocarbon ratio up to the desired level while at the same time the hydrocarbon charge rate is increased to maintain the space time substantially constant throughout; the rate of addition of fresh catalyst must be controlled to prevent the organic diluent concentration from declining below the desired level.

It is not intended that the various methods described above be considered as equivalents. In any given case one method of operation may be more desirable or more effective than another, e. g., the composition of the charging stock will in many cases have an important bearing upon the selection of a particular method of operation. If the charging stock contains substantial amounts of highly reactive constituents such as diolefins or isoolefins, the relative ease and rate of accumulation of organic diluent will be much greater than in cases where the charging stock contains only minor quantities of these highly reactive constituents. In some cases it may be desirable to employ a combination of the several methods.

For purposes of illustrating the advantages to be obtained by the present invention, the following experimental data are presented. It is not intended, however, that the invention be limited in any respect to the details of these specific examples.

For purposes of illustrating the fact that alkylate of inferior antiknock properties is produced when a relatively fresh hydrogen fluoride catalyst is employed for the alkylation of isobutane with butylene, a 16 day acid depletion run was made during which time no fresh catalyst was added to the system. The charging stock comprised a butane-butylene fraction having a total olefin content of 12 mol per cent and an isobutane to butylene mol ratio of 6:1. The apparatus employed in the run comprised a mechanically agitated contacting zone of the Turbo mixer type, a settling zone, and means for recycling the lower catalyst layer to the contacting zone. The upper hydrocarbon layer was subjected to appropriate fractionation steps for the recovery of the desired alkylation products.

The run was conducted at 100° F. reaction temperature, 180 pounds per square inch gage, and an average space time of 30 minutes. As previously mentioned no fresh catalyst was added to the system during the course of the run. From time to time, however, small samples of the used catalyst were withdrawn from the system for analysis. At the start of the run the volumetric ratio of catalyst to hydrocarbon was 1.5 but this ratio decreased slightly during the course of the run because of the withdrawal of catalyst samples. To counteract this effect, the hydrocarbon charge rate was decreased slightly during the run in order to maintain a substantially constant space time.

The pertinent experimental data from this run are tabulated in Table I below:

*Table I*

| Days from start of run | ASTM octane number of total alkylate | Titratable activity of cat. phase, wt. per cent HF |
|---|---|---|
| 0.5 | 90.6 | |
| 1.5 | 91.4 | 92.7 |
| 3.0 | 92.3 | |
| 3.6 | 93.5 | |
| 4.5 | 94.9 | 90.9 |
| 7.5 | 93.8 | 89.3 |
| 11.0 | 93.9 | 83.4 |
| 15.0 | 93.9 | 81.5 |

From the above data it is clear that for approximately the first 3½ days of operation, alkylate of decidedly inferior octane number was produced. However, as the organic diluent content of the catalyst increased with continued use (as reflected in the decreasing titratable acidity) the octane number of the alkylate improved markedly. After 7½ days of operation the octane number of the alkylate became substantially constant and no further improvement was noted with decreasing titratable acidity of the catalyst.

It will thus be seen that any means of decreasing the total quantity of alkylate produced during the 3½ day preliminary period or any means of shortening the duration of this period would comprise a decided improvement over the above operation. In general, the concentration of organic diluent in the catalyst phase which must be reached before alkylate of satisfactory quality is obtained cannot be specified within narrow limits since the most desirable catalyst composition will vary dependent upon the nature of the charging stock and the conditions of operation. For isobutane-butylene alkylation, however, it has been noted that usually the titratable acidity of the catalyst phase must decrease to at least 91 weight per cent HF before satisfactory alkylate is produced. Dependent upon other factors, the most desirable operating level of total acidity usually falls within the range of from about 75 to about 91 weight per cent HF.

As hereinbefore described, the preferred method of approach to this problem is to correlate operating conditions whereby to increase the rate of formation of organic diluent during the preliminary period of operation with a relatively fresh catalyst.

The principal operating techniques to achieve this result have been designated hereinbefore as (a), (b), and (c). The following experimental data are presented for purposes of illustrating the effect of temperature, isoparaffin to olefin ratio, and space time on the rate of formation of organic diluent. In all of these tests the titratable acidity of the catalyst phase was maintained substantially constant by continuous withdrawal of a portion of the used catalyst and replacement with fresh catalyst. In each case the increase in the rate of formation of organic diluent is measured primarily by the ratio of the volumes of alkylate produced per volume of catalyst phase which must be withdrawn from the system and replaced. In one case the fresh catalyst space velocity also provides an indication of the increased rate of formation of organic diluent.

The experimental data shown in Table II below were obtained using a butane-butylene feed stock having an isoparaffin to olefin mol ratio of from about 3.1 to about 3.5 and a total olefin content of from 16.2 to 17.5 mol per cent. The runs in each case were from 16 to 24 hours in duration. Substantially constant titratable acidities were maintained in each test by the method hereinbefore described.

Table II

| Series | A | | B | | | C | | |
|---|---|---|---|---|---|---|---|---|
| Run No | 1 | 2 | 3 | 4 | 5 | 6 | 7 | 8 |
| Total titratable acidity of cat. phase, wt. per cent HF | 73.3 | 75.4 | 77.5 | 80.0 | 80.4 | 86.0 | 86.2 | 88.6 |
| Temperature, °F | 100 | 100 | 100 | 100 | 101 | 100 | 100 | 100 |
| Pressure, lbs. sq. in. gage | 157 | 159 | 167 | 180 | 160 | 157 | 173 | 155 |
| Vol. ratio cat. hydrocarbon in reaction zone | 1.1 | 1.0 | 1.0 | 1.1 | 1.2 | 1.0 | 1.1 | 1.0 |
| Space time, min | 38 | 10 | 65 | 37 | 11 | 62 | 36 | 10 |
| Vol. alkylate/vol. cat. phase withdrawn | 35.5 | 15.9 | 55.3 | 23.8 | 8.0 | 16.6 | 11.9 | 5.9 |
| Fresh cat. space velocity hr.$^{-1}$×10$^3$ | 1.0 | 8.2 | 0.6 | 1.5 | 14.9 | 2.1 | 3.0 | 24.1 |

These data show three series of test at substantially different acidity levels. Series A was made at a relatively low acidity level and it is apparent that in going from 38 to 10 minutes space time the rate of formation of organic diluent is increased greatly as evidenced by the decrease in the volumes of alkylate produced per volume of catalyst phase withdrawn and also by the large increase in the fresh catalyst space velocity. Similarly, series B made at an intermediate acidity level shows the same effect when the space time is reduced from 65 to 37 to 11 minutes. Series C illustrates the same phenomenon at a relatively high acidity level.

Based on this marked effect of space time on the rate of formation of organic diluent the advantages of the operating technique hereinbefore designated as (c) are immediately apparent. To apply this method the alkylation unit is started up at a low volumetric ratio of catalyst to hydrocarbon, e. g., from about 0.1 to about 0.3, while maintaining the hydrocarbon charge rate at the design level. This results in a substantial decrease in the space time. During this period of operation the titratable acidity of the catalyst phase decreases rapidly and when the acidity has decreased to such a value that the quality of the alkylate is no longer improved, fresh catalyst is then added to the unit at such a rate that the acidity and quality of the alkylate will remain approximately constant. The fresh catalyst addition rate will be governed primarily by the rate of formation of organic diluent. When the desired catalyst to hydrocarbon ratio is reached, e. g., from about 1.0 to about 1.5, withdrawal and regeneration of the catalyst phase can be started.

The data shown below in Table III illustrate briefly the effect of temperature on the rate of formation of organic diluent. The isobutane-butylene charging stock employed in these tests had an isoparaffin to olefin mol ratio of 6:1.

Table III

| | Run No. | |
|---|---|---|
| | 1 | 2 |
| Temperature, °F | 100 | 153 |
| Space time, min | 26 | 21 |
| Titratable acidity of cat. phase, wt. per cent HF | 85.7 | 85.7 |
| Vol. alkylate/vol. of cat. phase withdrawn | 26 | 7 |

It is apparent from these data that increasing temperature causes a pronounced increase in the rate of formation of organic diluent. Therefore, the application of the operating technique hereinbefore designated as (a) is apparent.

In Table IV below the effect of isoparaffin to olefin ratio on the rate of organic diluent formation is shown.

Table IV

| Series | A | | B | | C | |
|---|---|---|---|---|---|---|
| Run No | 1 | 2 | 3 | 4 | 5 | 6 |
| Temperature, °F | 102 | 100 | 100 | 100 | 100 | 100 |
| Pressure, lbs./sq. in. gage | 168 | 159 | 150 | 173 | 153 | 167 |
| Space time, min | 11 | 10 | 37 | 36 | 65 | 65 |
| Titratable acidity of cat. phase, wt. per cent HF | 75.1 | 75.4 | 87.1 | 86.2 | 77.4 | 77.5 |
| Mol ratio isoparaffin/olefin | 4.9 | 3.1 | 5.6 | 3.5 | 5.2 | 3.5 |
| Vol. alkylate/vol. of cat. phase withdrawn | 27.8 | 15.9 | 16.8 | 11.9 | 72.4 | 55.3 |

Series A, B, and C represent series of tests made at substantially the same acidities and space times but with different isoparaffin to olefin ratios. The tests within each series show that the rate of formation of organic diluent is increased by a decrease in the isoparaffin to olefin ratio while other operating conditions are constant. Therefore, the advantages of the operating technique hereinbefore designated as (b) is apparent from the data.

I claim as my invention:

1. In a process for the production of branched chain paraffinic hydrocarbons wherein a paraffinic hydrocarbon containing at least one tertiary carbon atom per molecule is alkylated with an olefinic hydrocarbon in the presence of hydrogen fluoride catalyst, hydrocarbon reaction products are separated from used catalyst, and at least a portion of said used catalyst containing organic diluent is recycled to the alkylation zone, the improvement which comprises correlating the conditions of temperature, isoparaffin to olefin ratio, catalyst to hydrocarbon ratio, fresh catalyst space velocity and space time during the initial period of operation with a relatively fresh catalyst whereby to cause a substantial decrease in the rate of alkylate production, relative to the rate of formation of organic diluent and when the titratable acidity of the catalyst phase has decreased to within the range of 75 to about 91 weight percent hydrogen fluoride, readjusting said operating conditions to increase the rate of production of alkylate and to maintain the titratable acidity of the catalyst phase within the above specified range.

2. The process of claim 1 wherein a relatively higher reaction temperature is employed during said initial period of operation and subsequently said operating temperature is reduced.

3. The process of claim 1 wherein a relatively lower isoparaffin to olefin ratio is employed during said initial period of operation and subsequently said ratio is increased.

4. The process of claim 1 wherein a relatively lower volumetric ratio of catalyst to hydrocarbon is employed during said initial period of operation while at the same time the hydrocarbon charge rate is maintained substantially at the rate ultimately desired and subsequently said catalyst to hydrocarbon ratio is increased by the addition of fresh catalyst while still maintaining a substantially constant hydrocarbon charge rate.

5. The process of claim 1 wherein a relatively lower volumetric ratio of catalyst to hydrocarbon is employed during said initial period of operation while at the same time the hydrocarbon charge rate is substantially decreased to obtain a space time below that ultimately desired and subsequently said catalyst to hydrocarbon ratio is increased by the addition of fresh catalyst and said hydrocarbon charge rate is increased to obtain the desired space time.

ROBERT J. NEWMAN.